United States Patent [19]

Judson

[11] 4,187,903
[45] Feb. 12, 1980

[54] CONDENSERS

[76] Inventor: Philip N. Judson, 27 Fincham's Close, Linton, Cambridge, England

[21] Appl. No.: 857,969

[22] Filed: Dec. 6, 1977

[30] Foreign Application Priority Data

Dec. 15, 1976 [GB] United Kingdom ............... 52244/76
Jan. 14, 1977 [GB] United Kingdom ................. 1613/77

[51] Int. Cl.² ............................................... F28B 1/02
[52] U.S. Cl. ..................................... 165/76; 165/106; 165/110; 165/183
[58] Field of Search ................. 165/76, 110, 106, 154, 165/155

[56] References Cited

U.S. PATENT DOCUMENTS

| | | | |
|---|---|---|---|
| 1,189,797 | 7/1916 | Deppe | 165/155 |
| 2,047,757 | 7/1936 | Welch | 165/154 |
| 3,357,706 | 12/1967 | Wilkinson | 165/106 X |
| 3,687,612 | 2/1972 | Ernst | 165/105 X |
| 4,033,406 | 7/1977 | Baśiuliś | 165/110 X |

Primary Examiner—Albert W. Davis, Jr.
Attorney, Agent, or Firm—Beveridge, DeGrandi, Kline & Lunsford

[57] ABSTRACT

Apparatus is described for condensing vapors and the like. Two basic embodiments are described.

In the first embodiment the input and output connections of a standard Liebig type condenser are connected to a water jacket in a heat sink and water which is heated by the condensing action within the Liebig condenser transfers to the heat sink in which it loses its heat and returns as cool water to the Liebig condenser.

Oil may alternatively be used as the heat transfer medium between the condenser and heat sink.

In the second embodiment the condenser comprises a glass tube around which cooling fins are located in intimate contact with the tube. A window is provided by arranging that the fins do not extend completely around the tube to allow the interior of the tube to remain visible.

Additional cooling can be obtained by using forced draught from a fan and by blackening the surface of the heat sink.

4 Claims, 5 Drawing Figures

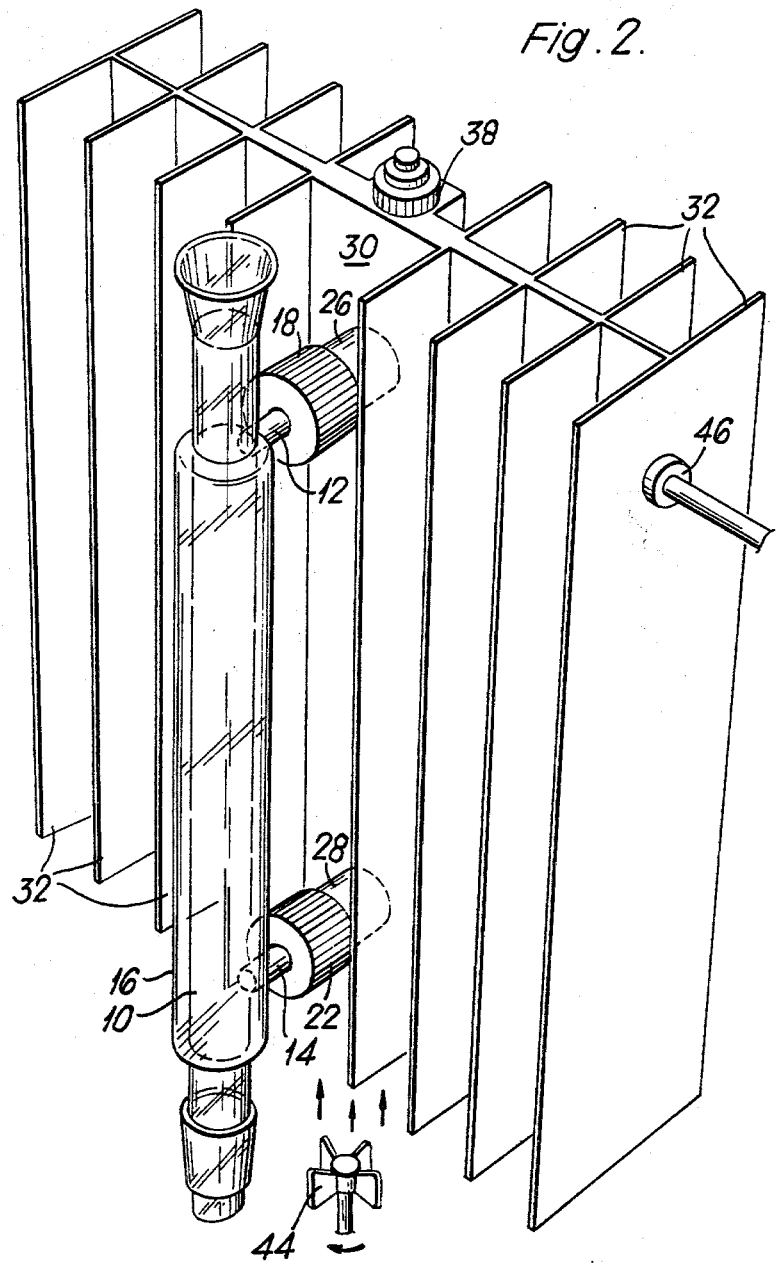

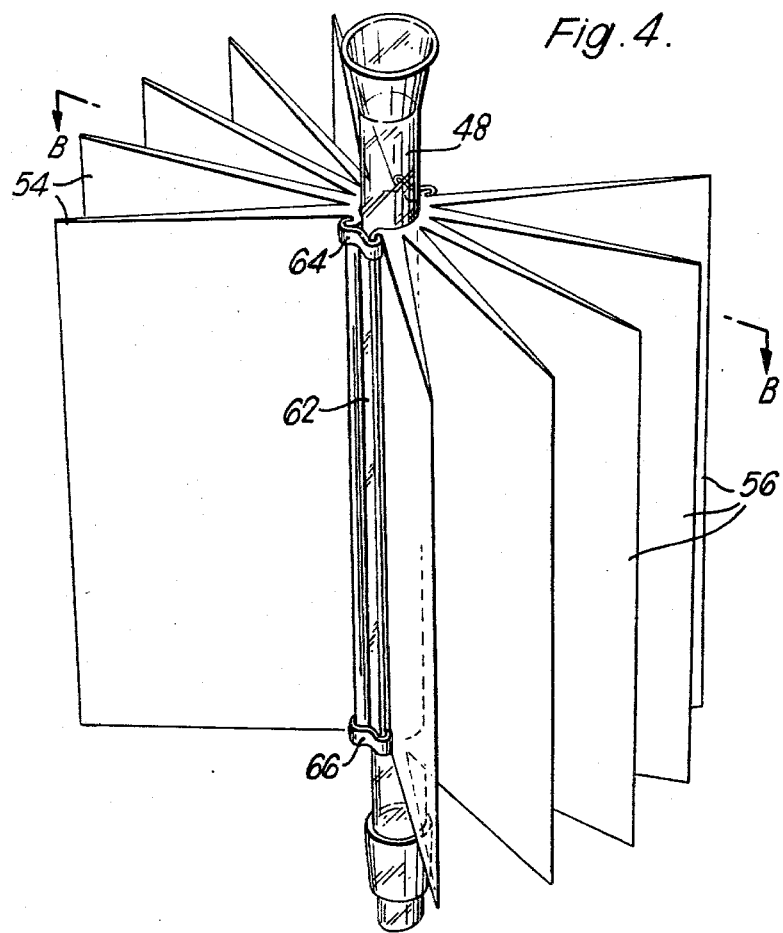
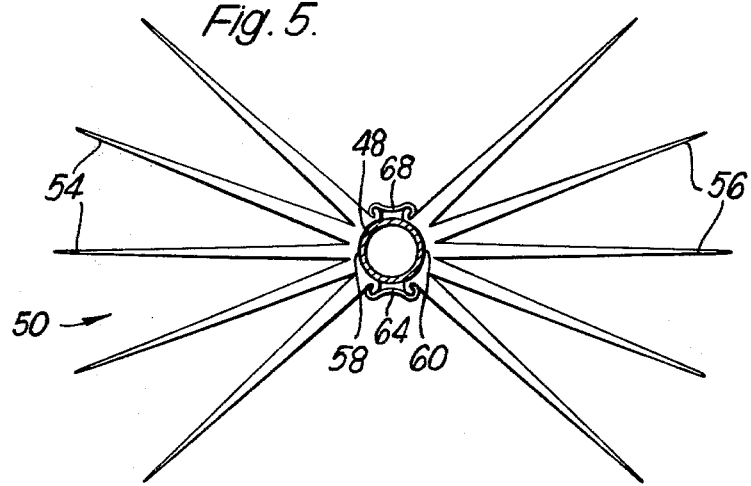

CONDENSERS

FIELD OF THE INVENTION

This invention concerns condensers of the type used to condense vapours and the like.

BACKGROUND OF THE INVENTION

Any cooled vessel can be used as a condenser and thus a piece of tube which is cooled by contact between its external surface and the surrounding air and into which hot vapour is passed will under appropriate circumstances act as a condenser. Greater efficiency is achieved by artificially cooling the tube and in the conventional Liebig condenser, the tube is surrounded by a second tube and the space between the two tubes is filled with water which is supplied to the space under pressure so as to be forced to flow therethrough and to constitute a cooling water jacket surrounding the inner tube. Such condensers have a limited thermal capacity and it is possible for the condensing operation to cease partially or completely if there is a drop in the pressure of the water supplied to the water jacket. Typical connections to the water jacket are simple push fit connections and a rise in water pressure can lead to a flooded laboratory.

Since such a condenser is usually attached to the cold water supply main, considerable variation in pressure can be expected during a 24-hour period and problems such as those outlined can become of paramount importance if an experiment has to be carried out under controlled conditions for a long period of time or if the experimental apparatus has to be left unattended.

DISADVANTAGES OF KNOWN APPARATUS

Conventional Liebig condensers require a large volume of water since they operate on a continuous flow basis, require to be located near to a tap on the cold water supply main and also require a suitable drain capable of handling the quantity of water which is to be discharged from the apparatus. It is not always convenient to provide such services and in any case the waste of water is undesirable.

OBJECT OF THE INVENTION

With these defects in mind, it is an object of the present invention to provide an alternative form of condenser for condensing hot vapours etc. which does not need to be connected to a water supply nor be located near to a drain and the operation of which does not involve the waste of considerable quantities of water.

THE INVENTION

According to the present invention apparatus for condensing hot vapours and the like comprises a condensing region which includes at least one surface (the condensing surface) on which hot vapours and the like will condense, at least one thermally conductive heat sink and a heat transfer path between the said condensing surface and the heat sink, for conveying heat therebetween.

As employed herein the term "heat sink" is intended to mean any body which is adpated to receive and readily dissipate heat by radiation and convection.

Conveniently the heat transfer path includes a heat transfer fluid such as water or oil.

The heat sink may be joined to and supported by apparatus incorporating the condensing region.

Alternatively the apparatus containing the condensing region may be supported by the heat sink.

Where a fluid is employed to transfer heat from the condensing surface to the heat sink, the heat transfer path preferably includes a first section for transferring heated fluid from the condensing region to a fluid path through the heat sink and a second for transferring fluid from the opposite end of the fluid path through the heat sink, after it has been cooled by passing therethrough, to return it to the condensing region to pick up heat once again from the said condensing surface. The joints between the apparatus containing the condensing region and the heat sink may comprise, at least in part, members defining said first and second sections of the heat transfer path.

Preferably the heat sink is detachable from the remainder of the apparatus. This will permit an alternative heat sink to be fitted or the existing heat sink to be cleaned or the apparatus containing the condensing region to be repaired or cleaned or replaced.

In one embodiment of the invention the condensing region comprises at least part of the length of an inner cylindrical member and the heat transfer path comprises an annular region around the internal cylindrical member which is bounded by an outer cylindrical member bonded at opposite ends to the said internal cylindrical member, pipe connections which extend laterally from the outer cylindrical member at opposite ends thereof to communicate with a fluid path through a heat sink wherein the heat transfer path is filled with a heat transfer fluid.

By forming both the inner and outer cylindrical members in the said one embodiment from glass, the interior of the condensing region can be observed.

The area of the condensing surface in the said one embodiment of the invention may be increased as in the so-called double surface Liebig condenser, by providing a tube of small diameter within the interior of the inner cylindrical member which communicates through apertures in the wall of the latter with the body of fluid in the annular region.

In another embodiment of the invention the condensing region comprises a tube through which hot vapours can pass, the internal surface of the tube comprising the said condensing surface and there is provided at least one heat sink and means for securing the latter to the tube so that at least a part of the heat sink is in close contact with at least a part of the external surface of the tube to cool the latter and assist in the condensing of hot vapour on the inside thereof.

According to one preferred feature the tube is formed from a transparent material such as glass and the heat sink does not completely surround the tube and a slit is left so that the interior of the tube can be viewed. In this way it is possible for the condensing region to be formed from a material such as glass which does not react with many substances at normal temperatures and pressures and to provide a heat sink made of a thermally conductive material which can if desired be opaque, the interior of the glass tube always being visible through the slit.

According to another preferred feature the means securing the heat sink to the tube is adapted to accommodate small relative movement of one part of the apparatus relative to another to allow for the effects of unequal thermal expansion.

The heat sink may comprise a single member or may be formed from a plurality of members secured around the said tube.

The tube may be cylindrical in which event the heat sink or members forming the heat sink are formed with a complementary inner curved surface which fits snugly against the outer surface of the said cylindrical tube and with an outer surface which is formed into vanes to present a large radiating surface area.

A shield may be fitted below a heat sink to protect it from heat rising from apparatus located therebelow.

Conveniently the means securing the heat sink or members thereof in contact with the tube comprises springs or clips or connecting pieces of elastic material which are attached to or stretched around the heat sink. Where a heat sink is employed which is formed from more than one member, the means securing the heat sink comprises springs or clips or connecting pieces of an elastic material which join the heat sink members one to another so as to encircle or partly encircle the tube.

A thermally conducting material may be inserted between the external surface of the tube and the inner surface of the heat sink or heat sink members, to improve thermal transfer. The thermally conducting material may be a flexible or compressible solid such as a plastics film, a soft metal or a compound metal and plastics film, or it may be a liquid or a semi-solid such as glycerol oil or grease.

The invention will now be described by way of example with reference to the accompanying drawings.

IN THE DRAWINGS

FIG. 1 is a side elevation in cross-section of a condenser embodying the invention, FIG. 2 is a perspective view of the unit shown in FIG. 1, FIG. 3 is a plan view in cross-section on the line A—A of the unit shown in FIG. 1, FIG. 4 is a perspective view of another embodiment of the invention, and FIG. 5 is a plan view in cross-section on the line A—A of the embodiment shown in FIG. 4.

DESCRIPTION OF EMBODIMENTS SHOWN IN THE DRAWINGS

Figure 1:
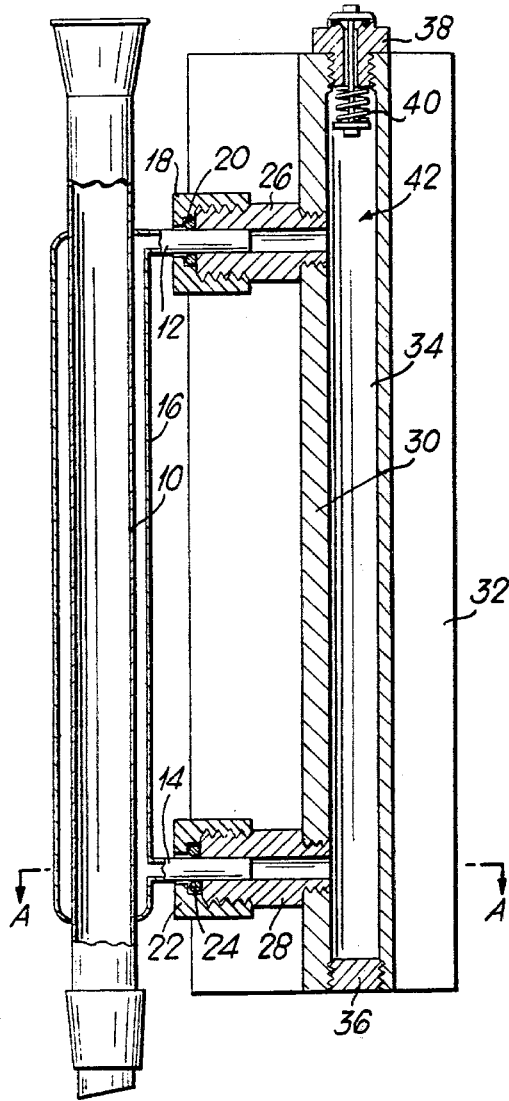
Figure 3:
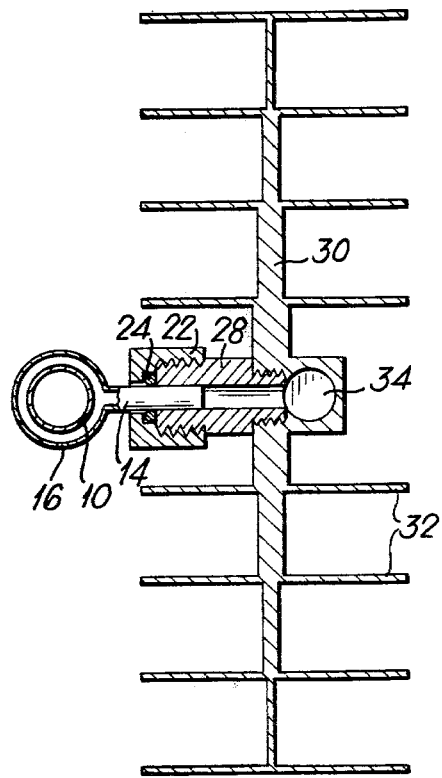

FIGS. 1 to 3 of the drawings refer to a first embodiment of the invention comprising a modified Liebig condenser having an inner tube 10, inlet and outlet pipes 12 and 14 which extend both on the same side of the condenser and an outer tube 16 which forms with the inner tube 10, a water jacket.

Gland nuts 18 and 22 and seals 20 and 24 serve to join the inlet and outlet pipes 12 and 14 to connecting tubes 26 and 28 which are threadedly engaged in threaded ports in a central web 30 of a heat sink having cooling vanes 32 which extend from the central web 30 as can best be seen in FIG. 2.

The central web includes a lengthwise drilling 34 which is closed at the lower end by a bung 36 and at its upper end by a filler cap 38 which incorporates a pressure relief safety valve having a spring 40.

When in use the passage 34, connecting tubes 26, 28 and jacket 16 are filled with a liquid such as water or oil. Typically a space is left in the region of the drilling 34 denoted by the reference numeral 42 so as to allow for expansion of the water or oil.

Heat from hot vapours entering the lower end of the tube 10 is transmitted through the walls of the tube to the fluid in the jacket 16 surrounding the central tube. In known manner the heated liquid in the jacket 16 rises and transfers via connecting tubes 12 and 26 to the upper end of the passage 34.

The heat sink is formed from material having a high thermal conductivity such as aluminium or copper or steel including stainless steel and heat from the liquid is immediately transferred to the heat sink which radiates the heat and causes the temperature of the liquid to drop as it is displaced through the passage 34 to return to the condenser jacket via the lower connecting tubes 28 and 14.

Screw-threaded joints between the web 30 of the heat sink and the connecting tubes 26 and 28 are shown in FIG. 1 but alternatively (not shown) the joints may be made by pressing in tubes which are turned to a close fit or by welding or brazing instead of using screw-threaded joints.

Where the length of the condenser is approximately 200 mm it has been found that for the average ambient temperatures, (i.e. in the range 15° to 20° C.) a heat sink having a surface area of 2000 cm$^2$ is required.

The heat sink may be blackened to improve efficiency and further cooling may be achieved by inducing a forced draught as by a fan 44 (see FIG. 2).

A temperature sensor such as a thermocouple 46 as shown in FIG. 2 may be attached to the heat sink and used to determine the operating temperature of the heat sink and as a corollary the operating temperature of the condenser. An electrical signal derived from the temperature sensor may be used after amplification to control the operation of the fan such as 44 and if the temperature is still exceeded to control the shutting down of the plant (not shown) producing the vapour to be condensed.

The joints between the inlet and outlet tubes to the jacket 16 and the connecting tubes (12, 26 and 14, 28) may be conventional ball and socket or conical joints instead of the sealed gland joints as shown in FIG. 1. Alternatively flexible tubing may be incorporated which is a simple push fit over the two tubes (12 and 26 at the upper end and 14 and 28 at the lower end).

All parts of the apparatus other than the heat sink and gland seals may be made of any suitable material which is not corroded by water and is able to withstand moderate heat and the corrosive atmosphere of a laboratory. Such materials as polyvinylchloride, nylon, h.d. polyethylene, polypropylene, aluminum, copper, stainless steel, protected steel and glass may be used. In practice the condensing tube 10 and jacket 16 will be made of glass.

In the embodiment shown in FIGS. 4 and 5 the condensing region is a cylindrical tube 48. Two heat sink sections 50 and 52 having vanes 54 and 56 and curved surfaces 58 and 60, each extend approximately one quarter the way around the outer surface of the tube 48, leaving elongate axial windows on opposite sides of the tube, of which only one 62 can be seen in the drawing.

The heat sink sections are linked the one to the other on the one side by means of spring metal clips 64, 66 and on the other side by either similar spring metal clips or rigid links of which one can be seen at 68 in FIG. 5. The links or clips joining the heat sink sections are inserted into holes (not shown) drilled into the heat sink sections. Alternatively (not shown) they may be fitted into a raised flange on each heat sink rather than inserted into holes.

In use, heat from hot vapours entering the condensing space is transmitted through the walls of the condenser tube 48 to the heat sink sections 50, 52. The heat is transferred by conduction into the vanes 54, 56 from which it is transmitted by radiation and convection to the surrounding air. The heat sink sections may be blackened to improve their radiating efficiency.

For average ambient conditions in the range 15° to 20° C., a condenser tube 48 100–400 mm long is required and the heat sink sections should have a combined surface area of 0.1 to 0.4 m². These dimensions are suitable for most applications but different dimensions may be appropriate for special purposes. The ultimate limits are that the device should not be so small that the condensing space becomes choked by condensed vapours nor so large that its size causes inconvenience in use.

The condensing tube 48 may be made of any suitable material which is generally chemically inert. In practice it will normally be of glass. The heat sink sections may be made of any thermally conductive material which is reasonably resistant to corrosion such as aluminium and its alloys, copper and its alloys, stainless steel or protected steel. Preferred material for the heat sink sections is aluminium or an alluminium alloy.

In order to improve the thermal transmission through a glass walled tube such as 48, a strip or wire of metal such as copper may be embedded in the wall of the tube, typically in the form of a helix the axis of which coincides with the axis of the tube. In this way heat in the region of the windows and other uncooled parts of the tube will be conveyed more readily than otherwise would be the case, to the cooled regions of the tube in contact with the heat sink. Where the wire is in the form of a helix the pitch is as small as possible whilst being consistent with the need to be able to see through the wall of the tube.

In the FIG. 1 to 3 embodiment the filler cap may be threaded as shown or may be formed as a push fit in the drilling 34, and in that event may not include the pressure relief safety valve, since the bung 36 can be designed to be blown out of the drilling in the event of an excess pressure inside.

Also in the FIG. 1 to 3 embodiment the drilling 34 may be in a rod which is essentially of circular cross-section but which includes at least one flat surface against which the heat sink can be held in close contact as by screws, or rivets or by brazing or welding.

Instead of forming the passage 34 by drilling, the heat sink may be formed by an extrusion process and the passage 34 formed simultaneously as part of the extrusion process, so that no separate drilling is required.

Although not shown the heat transfer path between the condensing surface and the heat sink may include one or more heat transfer pipes of the type described in British Pat. No. 1027719.

In order to improve the efficiency of the device shown in FIGS. 1 to 3, forced circulation of the heat transfer fluid in the heat transfer path (formed by the jacket 16, passage 34 and connecting tubes 26 and 28) may be employed, by incorporating one or more pumps in the for example one of the connecting tubes 26 and 28.

I claim:

1. Apparatus for condensing hot vapours and the like comprising an inner cylindrical member at least part of which comprises a condensing region including at least one surface on which hot vapours and the like may condense; an outer cylindrical member bonded at opposite ends to the said inner cylindrical member; the said inner and outer cylindrical members defining an annular region therebetween; at least one thermally conductive heat sink comprising a central web, having a fluid passage extending from one end to the other end thereof, and a plurality of cooling fins extending transversely therefrom to improve the cooling thereof; two connecting tubes communicating with the two opposite ends of the fluid passage in the central web and extending laterally therefrom to constitute pipe receiving members; inlet and outlet pipes extending laterally from the said outer cylindrical member and sealingly fitted into the said pipe receiving members and the said annular region; the said inlet and outlet pipes, the said connecting pipes and the said fluid passage through the central web constituting a closed circuit adapted to be filled with a heat transfer liquid.

2. Apparatus as set forth in claim 1 wherein the inner and outer cylindrical members are formed from glass permitting the interior of the condensing region to be observed.

3. Apparatus as set forth in claim 1 wherein the said inlet and outlet pipes are releasably secured in the said pipe receiving members to allow the heat sink to be separated from the remainder of the apparatus.

4. Apparatus as set forth in claim 1 wherein the fluid passage extending through the said central web of the heat sink communicates with a fluid inlet at one end which is closed by a cap which incorporates a pressure relief safety valve.

* * * * *